United States Patent
Chandler et al.

(10) Patent No.: US 7,941,484 B2
(45) Date of Patent: May 10, 2011

(54) USER INTERFACES FOR COLLABORATIVE MULTI-LOCALE CONTEXT-AWARE SYSTEMS MANAGEMENT PROBLEM ANALYSIS

(75) Inventors: Christopher James Elphinstone Chandler, Boston, MA (US); Guy Barry Owen Bunker, Buckinghamshire (GB)

(73) Assignee: Symantec Operating Corporation, Mountain View, CA (US)

( * ) Notice: Subject to any disclaimer, the term of this patent is extended or adjusted under 35 U.S.C. 154(b) by 1579 days.

(21) Appl. No.: 11/156,848

(22) Filed: Jun. 20, 2005

(65) Prior Publication Data
US 2006/0288286 A1    Dec. 21, 2006

(51) Int. Cl.
G06F 15/16    (2006.01)

(52) U.S. Cl. ........ 709/204; 707/201; 715/264; 715/703; 715/748; 715/751; 709/224

(58) Field of Classification Search .......... 709/204–205, 709/223–224, 227; 707/201; 715/264, 703, 715/748, 751
See application file for complete search history.

(56) References Cited

U.S. PATENT DOCUMENTS

| | | | |
|---|---|---|---|
| 4,307,458 A | 12/1981 | Lin | |
| 4,685,060 A | 8/1987 | Yamano et al. | |
| 5,319,581 A | 6/1994 | Sakata et al. | |
| 5,664,206 A | 9/1997 | Murow | |
| 5,687,366 A | 11/1997 | Harvey | |
| 5,917,484 A | 6/1999 | Mullaney | |
| 6,067,510 A | 5/2000 | Kimura et al. | |
| 6,073,090 A | 6/2000 | Fortune | |
| 6,122,606 A | 9/2000 | Johnson | |
| 6,141,005 A | 10/2000 | Hetherington et al. | |
| 6,185,729 B1 * | 2/2001 | Watanabe et al. | 717/100 |
| 6,262,725 B1 | 4/2001 | Hetherington et al. | |
| 6,252,589 B1 | 6/2001 | Rettig et al. | |
| 6,353,855 B1 * | 3/2002 | Hendren, III | 709/228 |
| 6,559,861 B1 | 5/2003 | Kennelly et al. | |
| 6,623,529 B1 * | 9/2003 | Lakritz | 715/205 |
| 6,685,188 B2 | 2/2004 | Rehbein et al. | |
| 7,134,137 B2 | 11/2006 | Joshi et al. | |
| 7,231,342 B2 | 6/2007 | Edwards et al. | |
| 2002/0175937 A1 | 11/2002 | Blakely et al. | |
| 2003/0105816 A1 * | 6/2003 | Goswami | 709/204 |
| 2005/0149376 A1 | 7/2005 | Guyan et al. | |
| 2005/0160360 A1 * | 7/2005 | Nadamoto et al. | 715/513 |
| 2006/0004738 A1 | 1/2006 | Blackwell et al. | |

* cited by examiner

*Primary Examiner* — William C Vaughn, Jr.
*Assistant Examiner* — Mohamed Ibrahim
(74) *Attorney, Agent, or Firm* — Meyertons, Hood, Kivlin, Kowert & Goetzel, P.C.

(57) ABSTRACT

A method to provide user interfaces for multi-locale context-aware systems management problem analysis comprises receiving a request for information associated with a systems management event, dynamically identifying a first locale designation associated with a first user of a systems management tool and a second locale designation associated with a second user of the systems management tool, and the systems management tool concurrently displaying the information according to the first and second locale designations.

23 Claims, 7 Drawing Sheets

USER INTERFACES FOR COLLABORATIVE MULTI-LOCALE CONTEXT-AWARE SYSTEMS MANAGEMENT PROBLEM ANALYSIS

BACKGROUND OF THE INVENTION

1. Field of the Invention

This invention relates to computer systems and, more particularly, to computer systems management tools.

2. Description of the Related Art

The complexity of managing computer systems has been increasing rapidly. Mission-critical enterprise applications may be distributed over a large number (e.g., hundreds or thousands) of computer hosts and storage devices, and may in some cases comprise multiple independent layers or tiers provided by different vendors. Even applications intended for single users (e.g., intended for execution on a single desktop or laptop computer) may incorporate components from multiple vendors, and may rely on numerous hardware and software devices. Typically, different hardware and/or software vendors have developed their own custom approaches to the detection, diagnosis, debugging and resolution of problems and errors, and also to other systems management tasks such as logging audit trails, monitoring application behavior, etc. In the event of unexpected operating conditions or failures, hardware devices or software modules may be configured to generate messages (such as error messages or warnings) using terminology and formatting that may often be hard to decipher for non-experts. For example, the error or warning message may include a hexadecimal version of an address or identifier, instead of a descriptive name for an object. As a result, the user or administrator whose work is interrupted or made less productive by the unexpected operating condition may spend a substantial amount of time attempting to understand the message or messages, often without success. Ultimately, and especially for problems that may affect mission-critical applications, the appropriate expert may have to be found and consulted (sometimes at considerable expense to the end user and/or the vendor providing support), even in cases where the best response to the problem may require a relatively simple set of actions that the user could have performed if the generated messages had been more intelligible. Similar issues related to possible confusion caused by unclear system-generated messages may also arise in other systems management arenas not directly related to error diagnosis, such as event auditing, application monitoring, etc.

The problem of diagnosing computer systems has become even more complicated as the set of skills needed to understand and respond to systems management events have become more geographically dispersed, and as the user base for applications has expanded internationally. It may be a common occurrence, for example, for a particular user in a first country (e.g., Brazil) to buy a software application originally developed in a second country (e.g., the United States) and run the application on a computer system produced in a third country (e.g., Malaysia). In some cases, various levels of the support organizations for the computer hardware vendor and the application vendor may be physically located in a fourth and fifth country, respectively (e.g., Ghana and India). The computer system may be configured to gather error, warning and/or status messages from various hardware and software components in a central message repository, e.g., in a system-provided "Event Log" on computer systems employing versions of Windows™ operating systems from Microsoft Corporation or in "syslog" files or their equivalents on systems employing UNIX™-based operating systems. Over time, a large number of entries may be accumulated in such repositories, and each individual entry itself may include a large number of fields, which may be hard to assimilate using the interfaces traditionally provided to view such repositories.

If the user encounters a problem, such as, for example, a "hanging" (i.e., unresponsive) application or an unexpected reduction in performance, the user may be advised to consult the message repository in an attempt to troubleshoot the problem. A typical user (or even an expert user) may encounter several types of difficulties at this point, such as identifying which specific messages are relevant, understanding what the message contents or fields may mean, and/or identifying and performing corrective actions if any are needed. If the user cannot resolve the problem without external help, he or she may initiate a support call or open a "bug report" on the software or hardware component that is suspected to be at fault. Depending on the specific nature of the problem, the support call or bug report may have to be channeled through several levels of support organizations, e.g., among support personnel that may not all be fluent in the same set of languages, until the right expert is found. Each party involved in the problem resolution (e.g., the end user and one or more support staff members) may have to spend considerable time and effort trying to assemble and correlate the information provided by other parties (e.g., a description of the problem, the contents of one or more systems management messages, details of the environment in which the problem occurred, etc.) Language difficulties (i.e., a lack of an adequate level of fluency in a common language) may increase the chances of miscommunication and/or incomplete communication between the parties involved in the problem diagnosis and resolution, and may further increase the already high costs of support organizations.

SUMMARY

Various embodiments of methods and systems to provide user interfaces for multi-locale context-aware systems management problem analysis are disclosed. According to one embodiment, a method comprises receiving a request for information associated with a systems management event, dynamically identifying a first locale designation associated with a first user of a systems management tool and a second locale designation associated with a second user of the systems management tool, and the systems management tool concurrently displaying the information according to the first and second locale designations. For example, in a collaborative session of analysis of a system management problem, where a first participant in the session is a resident or native of the United States, and a second participant is a resident or native of France, both participants may be shown information on the problem in their respective preferred languages. In addition, when the first participant performs an action on a first region of the display (e.g., selecting a particular element or entry of the information in a region corresponding to a "United States English" locale), the systems management tool may be configured to automatically perform a corresponding action (e.g., highlighting the corresponding information in the French version of the information) in another region of a display where a different locale designation is being used. By automatically propagating such actions across different display regions, the probability of miscommunication or incomplete communication between participants collaborating in systems management problem analysis may be reduced.

At least a portion of the information being displayed according to the second locale designation may be transmitted over a wide area network in one embodiment; e.g., the participants in the systems management problem analysis may be geographically dispersed. A number of different techniques may be used to identify the locale designations to be used in the concurrent displays in different embodiments: for example, in one embodiment, one or more users may explicitly select the locale designations, while in other embodiments, the systems management tool may identify the locale designations automatically, e.g., based on a network address or an organizational database. The specific information to be displayed may be obtained from a variety of sources, including message catalogs, systems management message repositories, and other databases. In some embodiments, part or all of the specific information displayed to a particular user may be filtered, e.g., based on authorization privileges of the user or on environment variables associated with the user.

In one embodiment, the systems management tool may be configured to provide additional context-sensitive information and/or interfaces to perform corrective actions in response to the systems management event. In one implementation, in response to a request to provide additional information on a particular systems management event, the systems management tool may be configured to identify a category of events to which the particular systems management event belongs, and to generate and display context-specific information based on the category, e.g., in a more user-friendly or "natural" format for that category. For example, if the event is related to file system operations, the systems management tool may allow the user to invoke one or more file system tools (e.g., executable programs or services), or to fill out a special problem report form for file system related problems. The interfaces for the additional information, the invocation of additional programs, and or forms may each be formatted in accordance with a desired locale designation of the requesting user.

Figure 1:
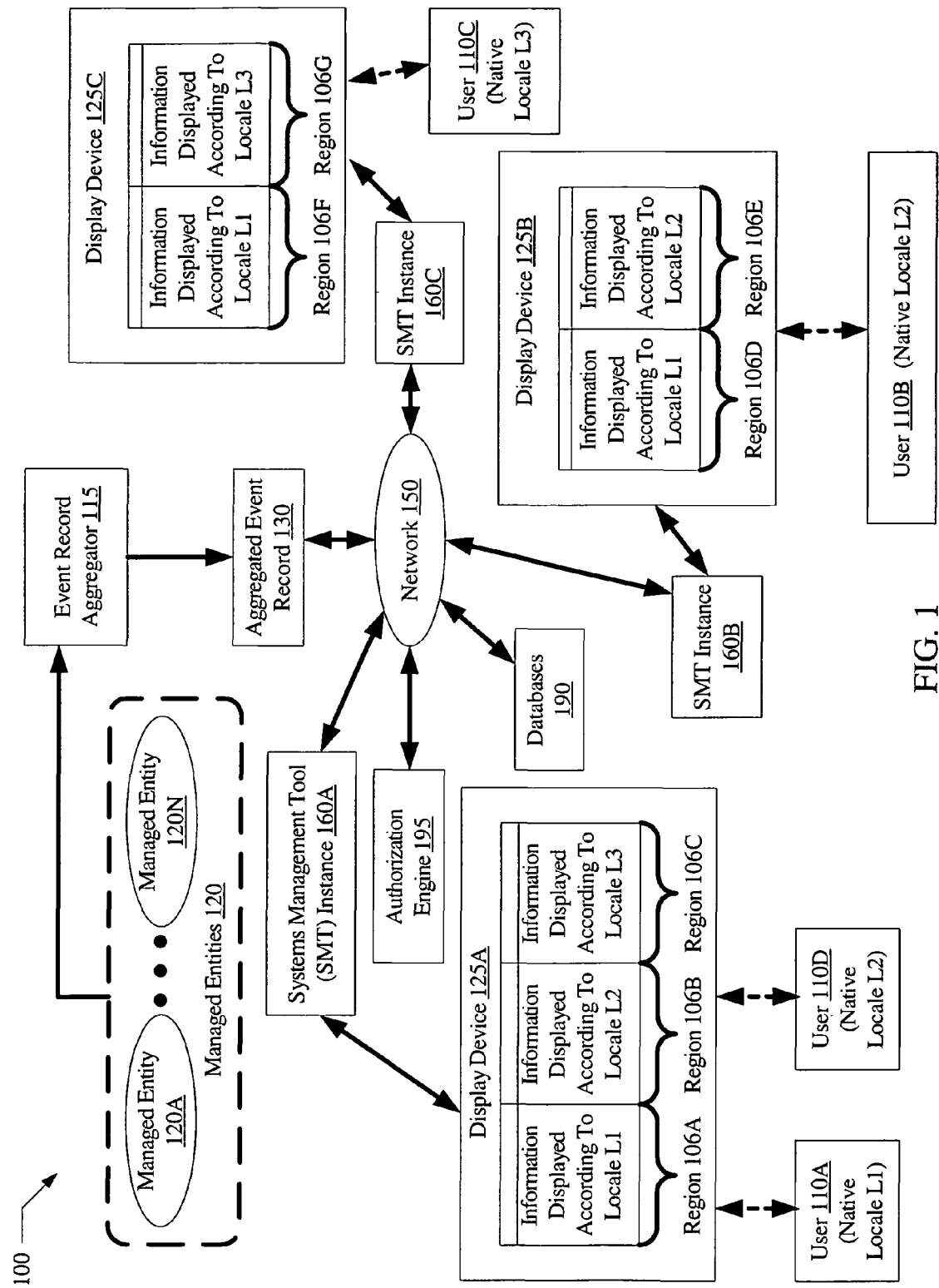
FIG. 1 is a block diagram illustrating one embodiment of a system.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

FIG. 1 is a block diagram illustrating a system 100 according to one embodiment. As shown, system 100 includes a plurality of instances 160A-160C of a computer systems management tool (which may be referred to herein as systems management tool 160) configured to support diagnosis and resolution of operational problems encountered in a set of managed entities 120A-120N (which may be referred to herein as managed entities 120). In particular, the systems management tool (SMT) 160 may be configured to support concurrent multi-locale display and analysis of information related to systems management events that occur at the managed entities 120. As shown, systems management tool 160 may be configured to generate a number of different views or displays of the same underlying systems management information for different users 110 or groups of users, such as a respective view on display devices 125A, 125B and 125C. At least one of the views may comprise a plurality of regions 106 (e.g., regions 106A, 106B etc.), where each region 106 within the view includes a concurrent and correlated display of the systems management data according to a different locale designation (e.g., in a different language). Further details on locale designations, the manner in which systems management information may be gathered, the format in which the information may be displayed, and the various components of system 100 are provided below. In some embodiments, a single view comprising two or more regions 106, generated by a particular instance of systems management tool 160, may be replicated at a plurality of physical locations for geographically dispersed users 110, e.g., using a video conferencing application. The information that is displayed may be gathered by systems management tool 160 from a variety of sources in different embodiments, such as an aggregated event record 130, one or more additional systems management databases 190, etc., some of which may be accessed over a network 150. In some embodiments, systems management tool 160 may also be configured to consult an authorization engine 195 to tailor the specific displays provided to different users 110, e.g., based on the authorization roles or privileges associated with the users The managed entities 120 may be configured to support any desired set of computer applications, such as enterprise-level applications (e.g., a tiered online banking application including a front-end web server tier, a mid-level application server tier, and a back-end database tier), workgroup applications, or single-user applications such as word processors, spreadsheet programs, computer or video games, etc. Managed entities 120 may thus include a variety of entities of different levels of complexity and aggregation in different embodiments, such as entire computer hosts, clusters of hosts, individual or aggregated storage devices (e.g., individual disks, disk arrays, or optical storage devices such as individual CDs or DVDs or jukeboxes of CDs or DVDs), components and peripheral devices included within or attached to computer hosts (such as keyboards, mice, display devices, network cards, CD/DVD readers/writers, USB (Universal Serial Bus)-attached devices, joysticks, digital cameras, etc.), network links, the software applications themselves, modules of the applications, and so on.

In one embodiment, at least some of the managed entities 120 may be configured to generate event records intended to help in diagnosing and/or resolving errors, in responding appropriately to unexpected operational behavior and in tracking or logging events or operations deemed to be of interest by the providers of the managed entities. Such event records, which may be exposed to users as error messages, warning messages and/or status messages in some embodiments, may be termed "systems management event records" herein, and the corresponding events may be termed "systems management events" herein. It is noted that while some types of systems management events may be associated with faults, errors or malfunctions, other systems management events may not. For example, a planned reboot of a personal computer or an intentional reset of a network interface may not represent an error condition, but may nevertheless count as a systems management event of interest, and may result in the generation of systems management event records in some embodiments.

An event record aggregator 115 may be configured to collect at least a subset of the generated systems management event records in one embodiment, and to produce an aggregated event record 130 from the collected records. The aggregated event record 130 may, for example, be implemented as a collection of timestamped event encodings which may not be stored in human readable formats, but may be converted to human readable format when needed. In some embodiments, the event record aggregator 115 may be a component of systems management tool 160, while in other embodiments, the event record aggregator 115 may be external to the systems management tool 160 (such as a service provided by an operating system). The event record aggregator 115 may be configured to provide a public application programming interface (API) in one embodiment, so that a variety of hardware or software vendors of different managed entities 120 may provide systems management event records in a consistent manner using the API.

Systems management tool 160 may be configured to format information about systems management events (such as error messages, possible corrective actions) etc., according to one or more "locale designations" for display to human users 110A-110D (collectively, users 110). The term "locale" or "locale designation", as used herein, generally refers to a component of a user's computing environment that defines conventions for a specified language, country, culture and/or region, such as the choice of human-readable language script and spelling, time formatting, numeric formatting, monetary formatting, character classification, conversion, sorting and collation. Some applications that are aware of and responsive to locale designations (which may be referred to as "localized" applications) may be configured to adapt the representation of their output to the locale of the particular user to whom the output is being provided. For example, if an output display includes a calendar date, the manner in which the data is displayed may differ depending on whether the output is being displayed to a user in the United States (where calendar dates are typically displayed in Month-Day-Year format), or to a user in India (where calendar dates may be typically displayed in Day-Month-Year format). In this example, confusion may result from the different interpretations in the United States and India of a date displayed as "01/02/2003", which may be interpreted as Jan. 2, 2003 in the United States, and Feb. 1, 2003 in India.

The internal and external representation of locale designations may vary from one implementation to another and/or from one application to another, and may be based on standards recommended by organizations such as ISO (the International Organization for Standardization) in some embodiments. In one implementation, for example, locale designations may be represented by one or more ASCII (American Standard Code for Information Interchange) text encodings, include encodings for languages (such as "en" for English) and optional encodings for geographical regions or countries (such as "US" for the United States, or "GB" for Great Britain). The optional region/country encodings may be concatenated with the language encodings. For example, the environment settings for a computer user in the United States of America may associate the default locale designation "en_US" with the user, indicating that the user's preferred language is English and the user's country is the United States. A localized application that detects the "en_US" locale designation associated with the user may be configured to display text, dates, numbers, etc. to the user according to the cultural and linguistic conventions used in the United States. The default locale designation for a user of the same application in England may be "en_GB" (indicating the Great Britain version of English), and the same underlying information may be displayed in a slightly different format to the user in the United Kingdom. In the following description, the term "locale" may be used synonymously with the term "locale designation".

In some implementations, a particular human-readable representation of aggregated event record 130, typically formatted according to a single locale designation specified at operating system installation time, may be created by default. Such representations may, for example, include a "syslog" file or equivalent files in UNIX™-based systems, and the "Event Log" in systems employing a version of Microsoft's Windows™ operating systems.

In response to a request for information associated with a systems management event, systems management tool 160 may be configured to dynamically identify locale designations associated with two or more users 110 of the tool in one embodiment, and concurrently display the requested information according to the identified locale designations. The request may be triggered in a variety of ways in different embodiments: for example, a particular user 110 may notice a specific entry in a syslog file or event log and request a concurrent multi-locale display of information related to that entry, or a user may notice a message in an application console or in an application-specific log and may wish to view information related to that message. In response to the request, systems management tool 160 may be configured to retrieve and/or correlate the information from a variety of sources such as the aggregated event record 130, and present the information according to the two or more locale designations. In a collaborative troubleshooting environment, for example, where user 110A and user 110B may be residents of different countries and may have different native languages, systems management tool 160 may be configured to display messages related to the systems management event concurrently in more than one language or format, so that the information may be received by each user in the particular language or format in which he or she may be most fluent. In the example shown in FIG. 1, the native or preferred locale designation for each of users 110A, 110B, 110C and 110D is abbreviated as L1, L2, L2 and L3 respectively. Systems management tool instance 160A provides a display of systems management information on a display device 125A including three regions 106A, 106B and 106C to users 110A and 110D. Instance 160B provide a concurrent display of the same underlying systems management information on device 125B including regions 106D and 106E to user 110B, while instance 160C provides a concurrent display on device 125C including regions 106F and 106G to user 110C. The information may be displayed within each region 106 according to a particular locale designation: L1 in regions 106A, 106D and 106F, L2 in regions 106B and 106E, and L3 in regions 106C and 106G. In some embodiments, at least a portion of the information being displayed on devices 120 may be transmitted over network 150, which may include, for example, one or more LAN (Local Area Network) or WAN (Wide Area Network) links. The information may be transmitted synchronously over network 150 in some embodiments, so that, for example, the view seen by each set of users 110 at a particular point in time is consistent with the view seen by other users on other displays 125 at that point in time. Network 150 may be a private network (e.g., a network used exclusively by a single enterprise or company) in some embodiments, and may include shared links, such as Internet links, in other embodiments. While multiple instances of systems management tool 160 are shown in FIG. 1, in other embodiments a single instance of the tool may be configured to provide multiple displays on a plurality of display devices 120.

As described below in further detail, in one embodiment, when a first user 110 selects a particular message or other information element displayed in a view containing a list or table of elements in accordance with the first user's locale preferences, systems management tool 160 may be configured to track the selection in the views seen by other users 110. For example, systems management tool 160 may be configured to automatically highlight the corresponding message or element in each of the other users' views, allowing each of the other users to read the message or information in his or her own preferred language or format. By supporting such automated tracking/highlighting of related information across locales, systems management tool 160 may help reduce the potential for miscommunication between users attempting to collaborate in resolving systems management problems. In addition, as also described below in further detail, in some embodiments systems management tool 160 may also be configured to provide context-sensitive detailed information (such as information on suggested corrective actions) related to the systems management event formatted according to users' locale preferences, which may make it easier for users to respond appropriately to the event while minimizing the time and effort required from technical support staff.

Systems management tool 160 may be configured to select the elements of systems management information to be displayed (such as the specific text of warning or error messages) from a variety of sources in different embodiments. In one embodiment, for example, the request may be initiated by double-clicking on an existing entry in a visual display of an application log or a system log. In such an embodiment, the existing entry may represent a message generated by an application or system component according to a particular locale designation, and systems management tool 160 may be configured to obtain additional versions of the application-generated message formatted according to other desired locale designations from one or more message catalogs that may have been installed along with the application. In some embodiments, part of the information displayed to a particular user may be obtained from one or more message catalogs, and part of the information may be based on one or more environment variables (i.e., other than a locale designation) associated with the user. Further details on how the specific other locale designations may be identified in different embodiments, and how environment variables may be used to determine displayed information, are provided below.

In some embodiments, the request for the information by a particular user 110 may serve as a starting point for a search of one or more databases 195 of systems management information. In one such embodiment, in response to the request, systems management tool 160 may be configured to parse the contents of the request (such as a selected log entry or text entered in a text area), and attempt to find related entries in the databases 190 as well as in one or more application logs or system logs. In embodiments where the request is initiated by selecting a particular entry in a system log, for example, the system log itself, as well as other logs and databases, may be searched. The related entries may be selected based on content (e.g., by matching terms) and/or based on time proximity (e.g., in implementations where log entries in various logs may include timestamps). Systems management tool 160 may also be configured to look up additional information (e.g., from system registries or installation records) that may be useful in troubleshooting problems related to the systems management event, such as an identification of the vendor or vendors that provided the managed entities involved in the event, warranty and support details, etc. The search may result in a reduction in the total amount of data that may otherwise have to be viewed when troubleshooting a problem, e.g., by eliminating unrelated messages from one or more logs and combining relevant log messages with useful information obtained from other databases.

In addition, the specific information that is eventually displayed to each user 110 may also be dependent on the authorization roles or privileges of the user in some embodiments. For example, in one implementation, having determined a set of information related to the systems management event that could potentially be displayed, systems management tool 160 may be configured to provide an identification of each participating user 110 to authorization engine 195, and select the specific subset of information that is actually displayed to each user based on information provided by the authorization engine. Such authorization-based restrictions may be particularly important in embodiments where a subset of users may not be authorized to view some of the information, where the information provided to the user may include suggestions on corrective actions, or where systems management tool 160 may actually provide an interface to initiate a corrective action, as described below in further detail.

The selection of the specific locale designations in which the information is displayed on a particular display device may be implemented using a variety of manual and/or automated techniques in different embodiments. For example, in one embodiment, systems management tool 160 may provide an interface allowing an explicit selection of the locale designations from among a plurality of locale designations. In one such embodiment, for example, a particular user 110 in a collaborative troubleshooting session may be designated as a session coordinator, and the session coordinator may be allowed to select the locale designations in which the information is displayed to various other collaborating users 110. For example, in the example of FIG. 1, user 110A may decide that the information should be displayed according to locales L1, L2 and L3 on display device 125A, but only according to locales L1 and L2 on display device 125B, etc. In one specific embodiment, a single display comprising a plurality of regions 106 (each formatted according to a different selected locale designation) may simply be replicated for viewing by the various users 110, e.g., using a video conferencing application. In other embodiments, each user or group of users may be allowed to independently specify the locale designations in which the systems management information is to be displayed.

Systems management tool 160 may be configured to automatically identify the appropriate set of locale designations to be used in some embodiments. For example, in one embodiment, each participating user 110 may log in using an interface provided by the systems management tool 160, and the user identifier provided as input during the login may be used by the systems management tool 160 to identify an appropriate locale designation for each user (e.g., by looking up the default locale designation associated with the user identifier in an organizational database such as an LDAP (Lightweight Directory Access Protocol) database). In another embodiment, systems management tool 160 may be configured to use a mapping of a network address to a geographical location to identify the locales—for example, if a user 110 establishes a network connection using IP (the Internet Protocol) to interact with systems management tool 160, the IP address used for the connection may be mapped to a geographical location, and hence to a likely appropriate locale designation. Such mappings of network addresses to physical locations may be performed either statically (using an existing database identifying locations of hosts or devices by IP address) or dynamically (by tracing packets sent to the user's host or device). Once the appropriate locale designation for each of the participating users has been identified, the combination of locales in which the systems management information is displayed to each user may be selected either automatically (e.g., by displaying the information according to all of the identified locales to each user) or based on manual input. In some embodiments where systems management tool 160 may select preferred locale designations using such automated techniques, users 110 may also be provided with an interface allowing them to override the selections made by the systems management tool.

Figure 2:
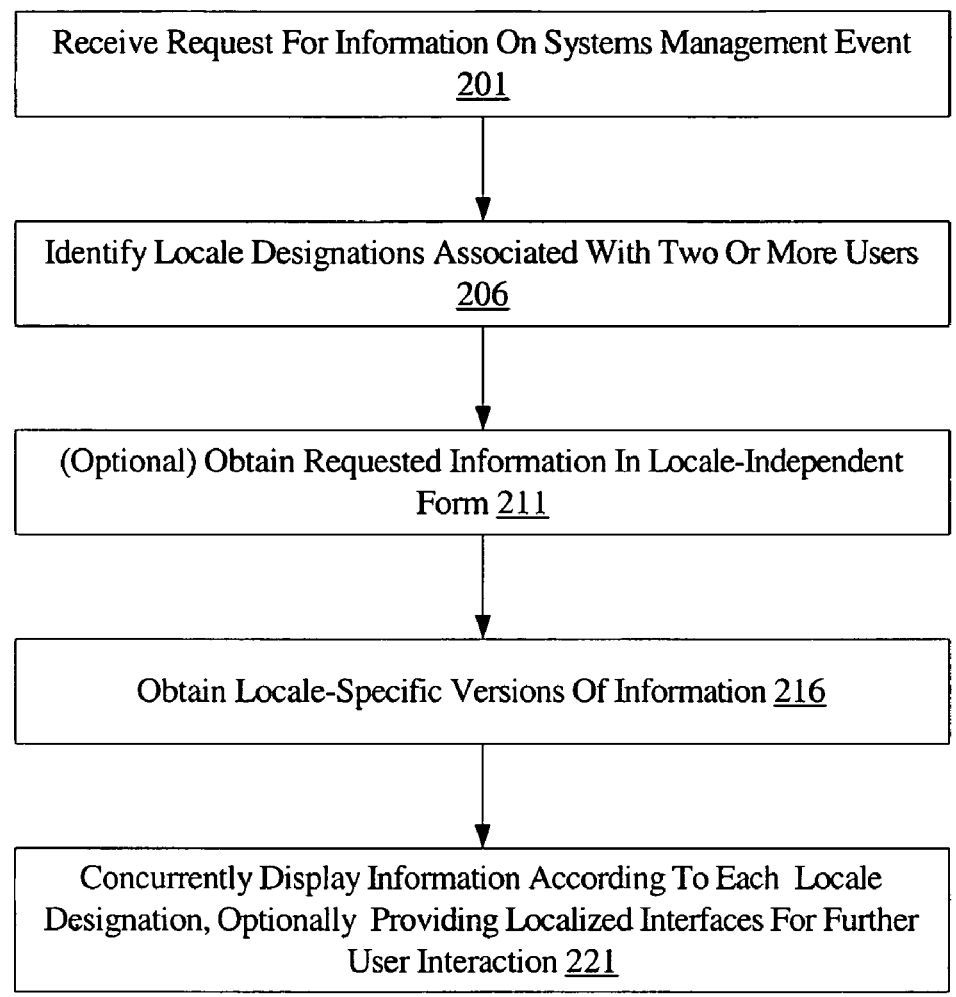
FIG. 2 is a flow diagram illustrating aspects of the operation of a systems management tool according to one embodiment.

FIG. 2 is a flow diagram illustrating aspects of the operation of systems management tool 160 according to one embodiment. In response to a request for information associated with a systems management event (block 201 of FIG. 2), the systems management tool 160 may be configured to identify locales or locale designations associated with each of two or more users (block 206). In some embodiments, the systems management tool may optionally be configured to obtain or gather information related to the systems management event in locale-independent form (block 211)—e.g., to obtain binary encodings of the information from aggregated event record 130 and/or additional databases. As noted above, in some embodiments, at least a portion of the underlying systems management information that is to be displayed may be identified as part of the request itself (e.g., if the request is generated from a log entry), while in other embodiments, systems management tool 160 may be configured to search for information relevant to the systems management event from among a plurality of sources. Locale-specific versions of the information may be obtained (block 216) by systems management tool 160, e.g., from one or more sets of message catalogs. In some embodiments, the locale-specific versions of at least a portion of the information may be generated dynamically, e.g., by a translation engine. Having obtained the locale-specific versions of the information, systems management tool 160 may be configured to display the information concurrently according to the two or more locale designations (block 221). Optionally, in some embodiments, systems management tool 160 may also be configured to provide one or more localized or locale-specific interfaces for further user interaction, as described below in conjunction with the descriptions of FIG. 5 and FIG. 6.

Figure 3:
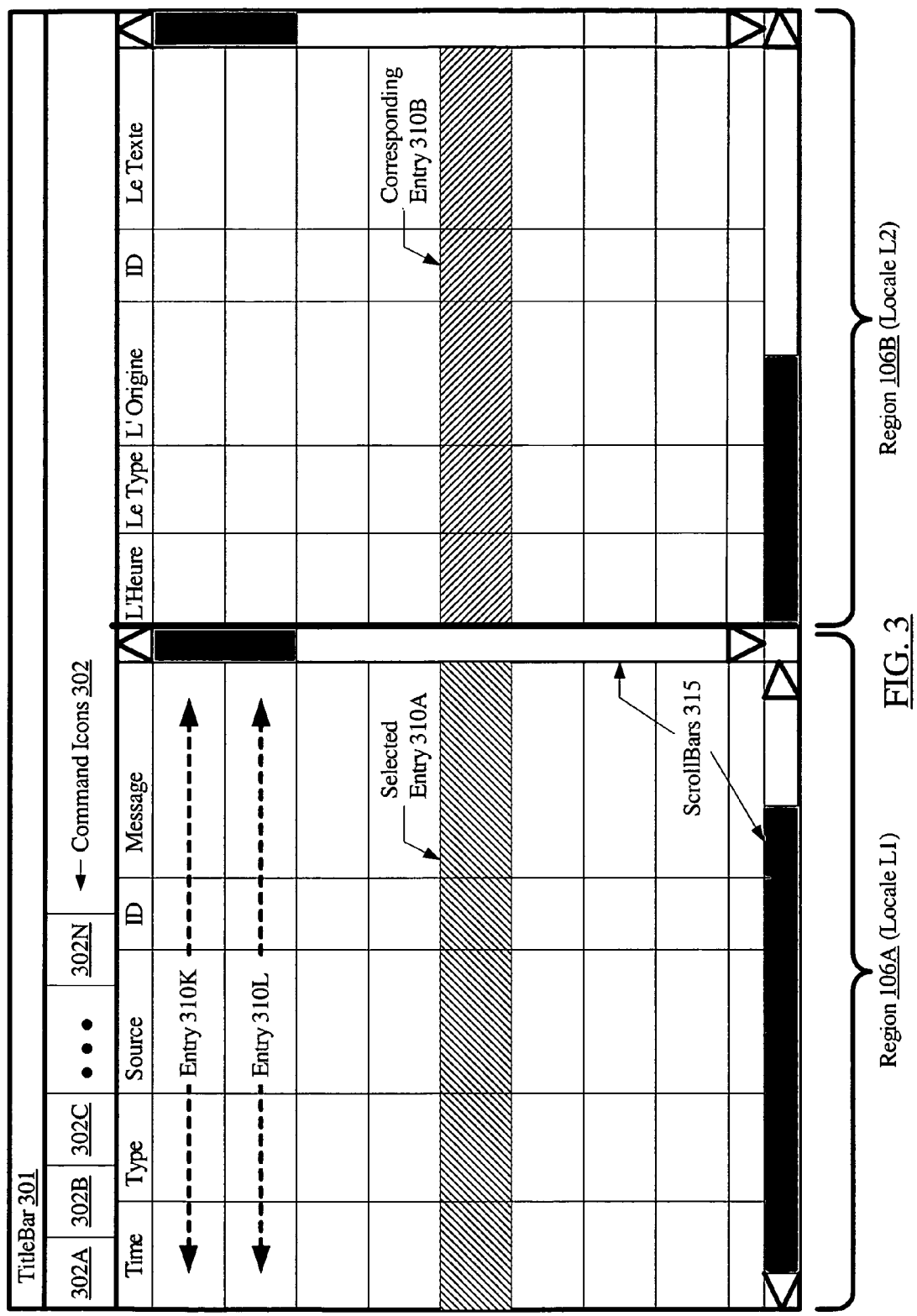
FIG. 3 is a block diagram illustrating aspects of one view of an exemplary graphical user interface (GUI) provided by a systems management tool according to one embodiment.

FIG. 3 is a block diagram illustrating aspects of one view of an exemplary graphical user interface (GUI) provided by systems management tool 160 according to one embodiment. As shown, the view may include a window comprising a title bar 301, a plurality of command icons 302 (e.g., 302A-302N), and two display regions or panels 106A and 106B for concurrently displaying systems management information according to locale designations L1 and L2 respectively. In some embodiments, the GUI may include other elements, such as one or more drop-down menus (e.g., a "View" menu to alter view properties such as fonts, orientations, etc., and/or a "Help" drop-down menu to provide access to information on the systems management tool 160), that are not shown in FIG. 3. The command icons 302 may support the invocation of any of a variety of commands, such as, for example, a "New" command to open a new view or window, an "Open" command to load and display an existing collection of systems management information, a "Save/Save As" command to save a modified version of systems management information, a "Print" command to print the displayed systems management information, a "Search" command to search for specified text or images within the display or an underlying systems management database, a "Sort" command to sort the displayed information, etc.

Figure 4:
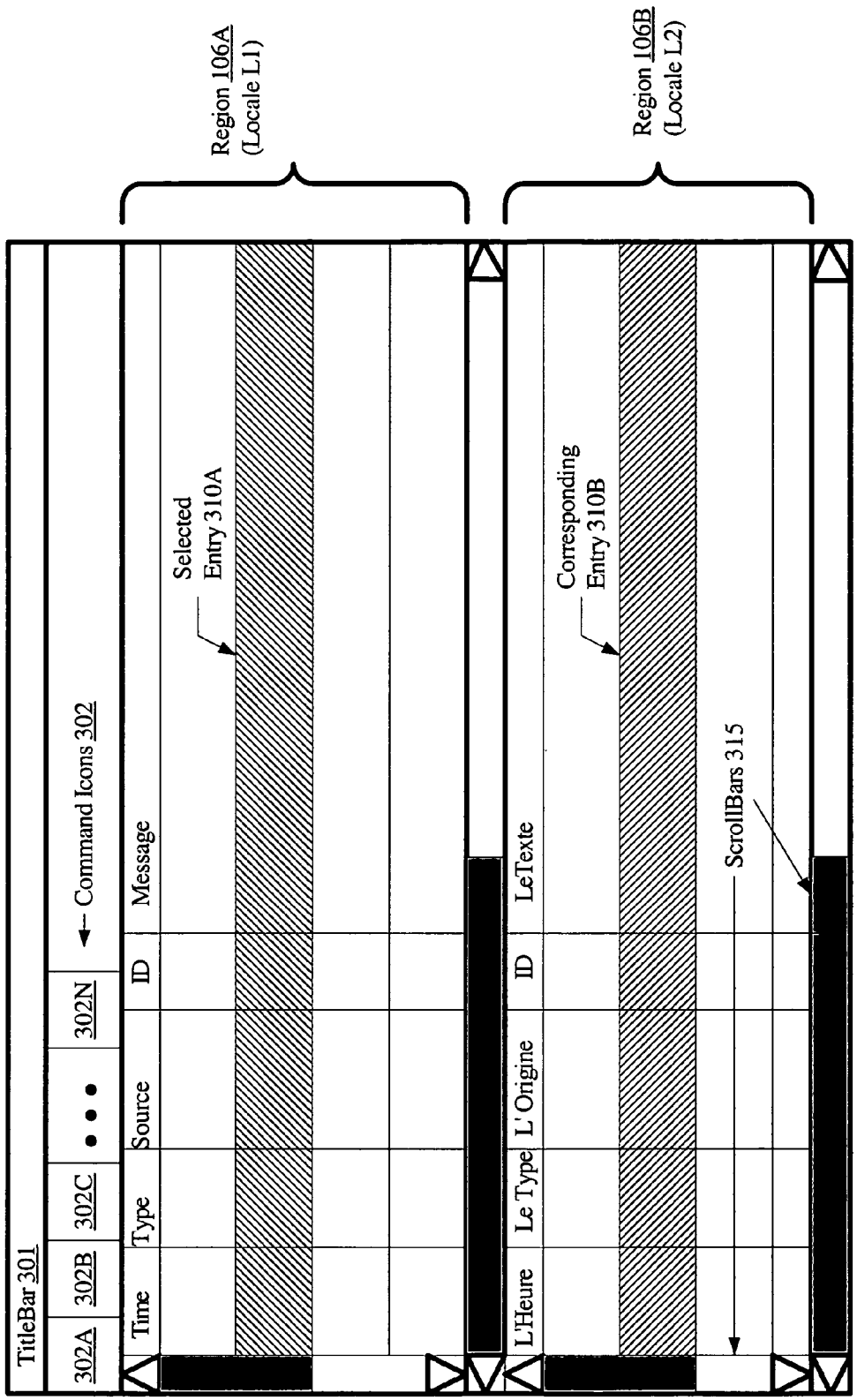
FIG. 4 is a block diagram illustrating aspects of a second view of the graphical user interface provided by the systems management tool according to one embodiment.
Figure 5:
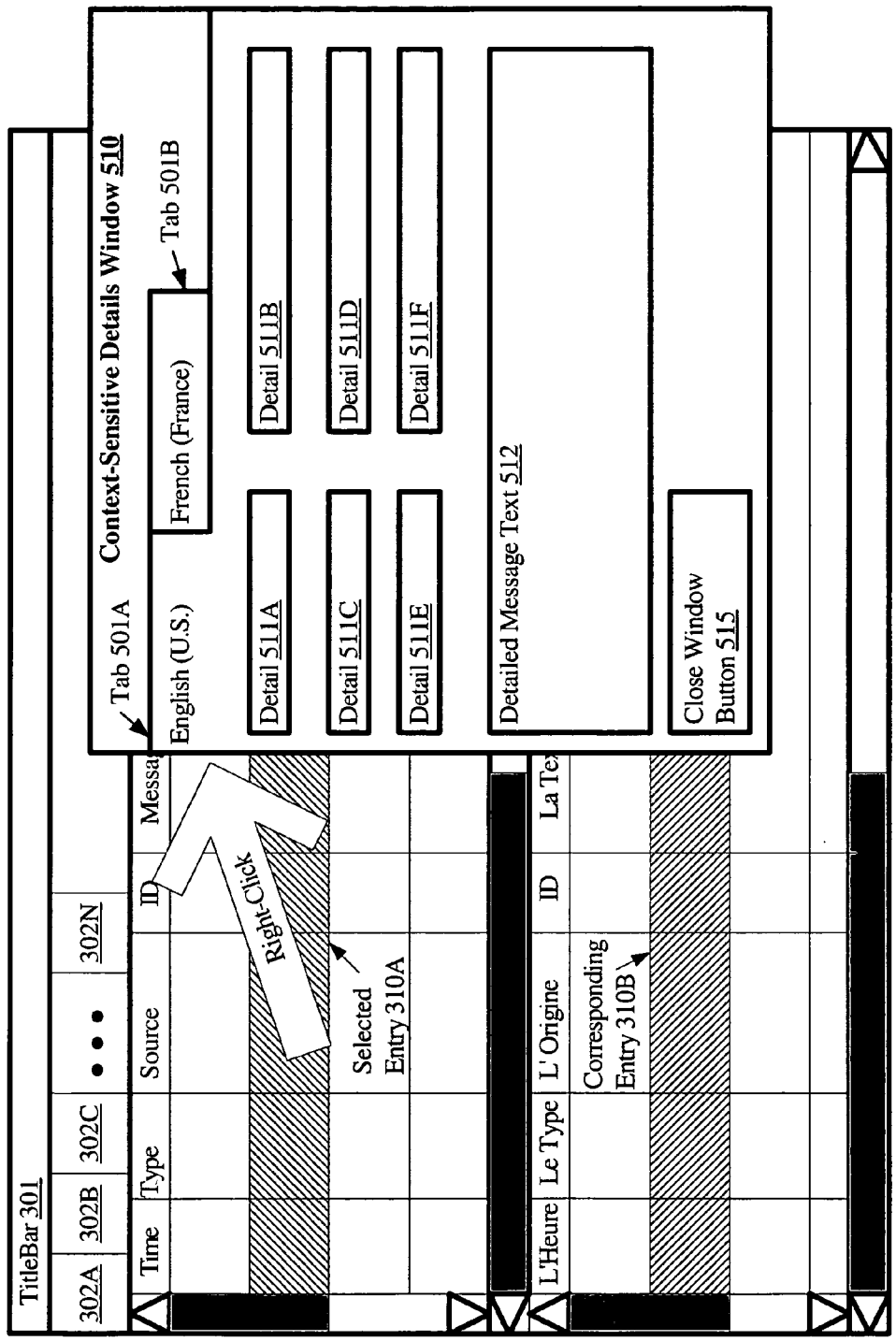
FIG. 5 is a block diagram illustrating further aspects of the functionality of an exemplary graphical user interface provided by a system management tool that may be used to display systems management information details and/or reformatted systems management information, according to one embodiment.
Figure 6:
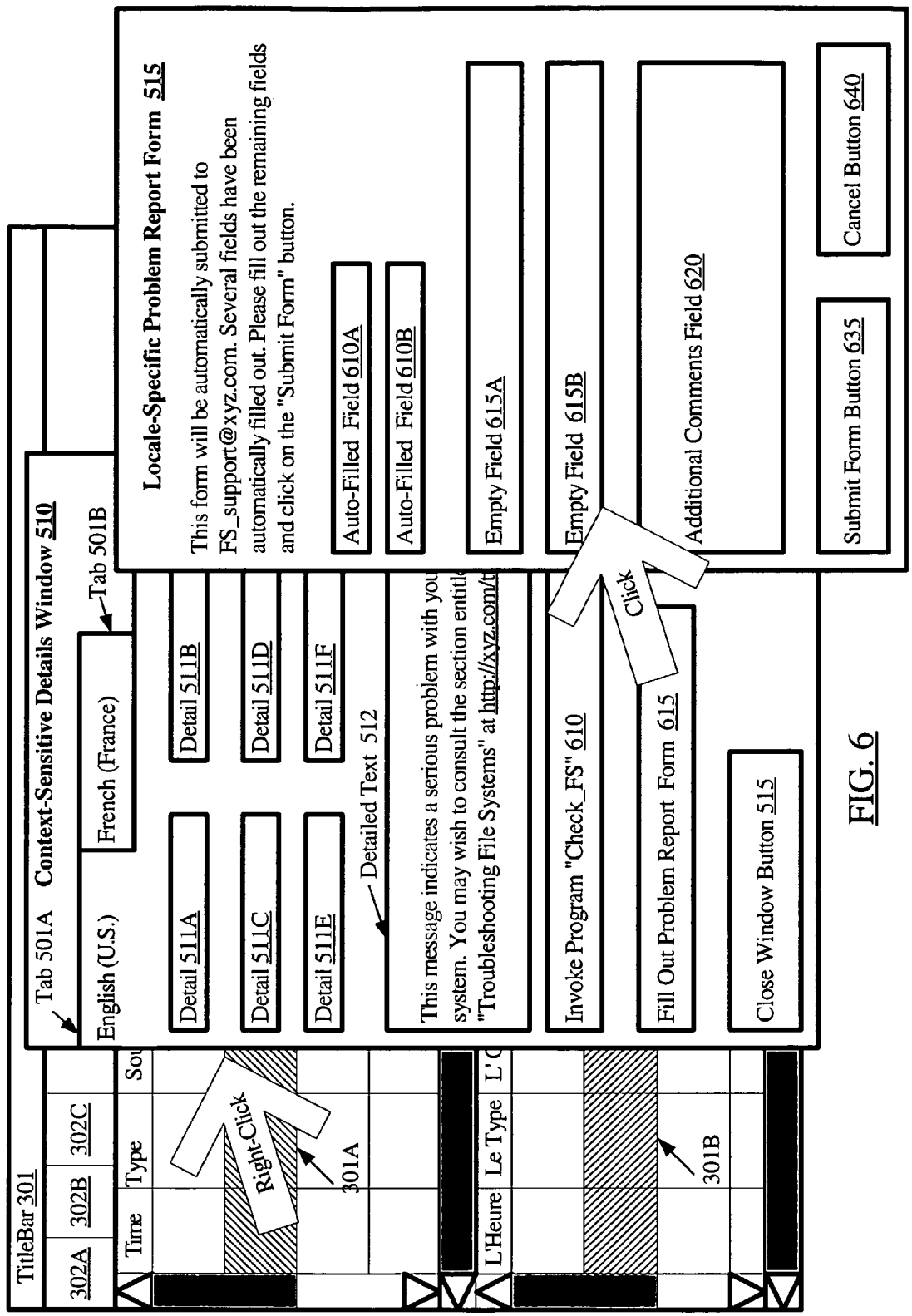
FIG. 6 is a block diagram illustrating further aspects of the functionality of an exemplary graphical user interface provided by a system management tool that may be used to automatically fill out a form or to invoke an executable program or service, according to one embodiment

In the example depicted in FIG. 3, systems management information is displayed as a set of entries 310 (such as entries 310K, 310L, selected entry 310A and corresponding entry 310B, etc.) where each entry within a given region 106 corresponds to a particular systems management event and includes a number of different fields or elements. For example, region 106A is formatted in FIG. 3 according to a United States English locale designation, and each entry 310 therein may include a "Time" field representing a timestamp, a "Type" field identifying the entry as belonging to a particular category of entries, a "Source" field identifying the managed entity 120 or component of managed entity where the event occurred, an "ID" field providing a unique identification for the entry, and a "Message" field including a text message associated with the event. Other fields may also be provided within each region 106, such as the name of an executable program that generated the entry, a process identifier and/or thread identifier associated with the entry, etc. Scrollbars 315 may allow up-down and left-right scrolling within each region 106. In various embodiments, vertical scrollbars may be located at the right edge of a region 106, or at the left edge as shown in FIG. 4-FIG. 6. In FIG. 3, region 106B includes a plurality of entries formatted according to a French locale designation. Each entry in region 106B includes a French version of the information included in the corresponding entry in region 106A: for example, entry 310B corresponds to entry 310A. The names of the columns or fields in region may also be presented according to the French locale in some embodiments - for example, a column entitled "L'Heure" in region 106B may correspond to the column entitled "Time" in region 106A. In one implementation, a separate set of command icons 302 may be provided for each region 106, and the symbols and/or text titles associated with each set of command icons may also be selected in accordance with the respective locale designations associated with the region.

In one embodiment, a mechanism or interface to select or highlight a particular entry 310 or a set of entries 310 may be provided as part of the graphical user interface. For example, in one implementation, a user 110 may click on any part of an entry 310 may using a pointing device such as a mouse, and such a click may indicate a selection of the entry by the user. The selected entry 310 may be displayed in a special manner to distinguish it from other entries, e.g., it may be displayed in a different color, or in bold fonts, etc. In some embodiments, a selection of a particular entry (e.g., entry 310A) within a given region (e.g., 106A) may automatically trigger a selection of the corresponding entry in other regions (e.g., entry 310B in region 106B) by systems management tool 160. That is, in such embodiments, when a first user selects a particular entry, systems management tool 160 may automatically track or propagate the selection and highlight the corresponding entries in other regions, allowing other collaborating users to quickly identify the information corresponding to the selected entry in their own preferred language and/or format. The automatic propagation may extend to regions being displayed at multiple display devices 125 in some embodiments—for example, in FIG. 1, a selection of an entry 310 in region 106A by user 110A may result in corresponding entries being synchronously highlighted in all the concurrently-displayed regions, such as 106B, 106C, 106D, 106E, 106F and 106G. Such automated propagation of selected entries may help to ensure that all collaborating users are focused on the same set of underlying systems management information, and may help, for example, to reduce the likelihood of ambiguity, confusion or human error in identifying the system management events that are to be examined or investigated. Similar automated highlighting may also be supported for columns and/or individual fields in some embodiments: for example, when a first user selects the "ID" column (e.g., by clicking on the "ID" column title), the corresponding columns may be highlighted in other regions 106 as well.

A variety of additional controls or interfaces may also be supported in the graphical user interface in some embodiments, such as the ability to hide one or more columns or entries. One or more actions that result from the use of such controls or interfaces in a particular region 106 may also be propagated to the other regions 106. For example, if a first user hides the "Source" column in region 106A using a particular interface, in one embodiment the corresponding column may also be automatically and synchronously hidden in one or more of the other regions 106. In some embodiments, the graphical user interface may also include one or more controls to control the extent of propagation of actions such as selection, hiding, sorting, etc. across the various regions. For example, it may be possible in one embodiment for a user to decide whether a specific action is to be propagated to other regions 106, or all actions of a particular type (where different action types may include, for example, selection, hiding, scrolling, etc.) are to be propagated to other regions, and if so, to which specific regions the action or actions are to be propagated. In embodiments where such selective propagation may result in the regions 106 becoming unsynchronized (e.g., where the different regions 106 may happen to be displaying different sets of information at a given point in time as a result of selective propagation), an interface may also be provided to synchronize the different regions 106—e.g., user 110A may be allowed to issue a command that results in all the regions 106 showing columns and entries that correspond to those being currently shown in region 106A. It is noted that while FIG. 3 shows an example where only two regions 106 are displayed within a view, the same graphical user interface that is used to generate the view shown in FIG. 3 may also allow multiple regions 106 to be displayed together on a single display device 125. In addition, the specific input interfaces (e.g., buttons, scrollbars, etc.) and/or output formats may differ from those shown in FIG. 3 in some embodiments.

FIG. 4 is a block diagram illustrating aspects of a second view of the graphical user interface (GUI) provided by systems management tool 160 according to one embodiment. While in the view shown in FIG. 3, the regions 106A and 106B were located beside each other, i.e., the view was divided into a left side including region 106A and a right side including region 106B, regions 106A and 106B are stacked vertically in the view shown in FIG. 4. In some embodiments, an interface (such as a drop-down menu item or a command icon 302) may be provided to allow a user to switch between the vertical stacking orientation shown in FIG. 4 and the horizontal orientation shown in FIG. 3. The ability to track selection and automatically propagate actions from one region 106 to another may be supported independently of the orientation of the regions. For example, in one embodiment, regions 106A-106B may be displayed in a vertical stacking orientation on a first display device 125A, and regions 106C and 106D may concurrently be displayed in a side-by-side orientation on a second display device 125B. In such an embodiment, a selection of an entry 310A within region 106A may result in a highlighting of the corresponding entries in other regions 106B-106D, even though some of the other regions may be being displayed in a different orientation than the region in which the selection was made.

In some embodiments, based on the specific type of systems management events being examined or analyzed, systems management tool 160 may be configured to provide additional detailed information, and/or to display the information that may be contained in an entry 310 in a more useful or more user-friendly format to users 110. FIG. 5 is a block diagram illustrating further aspects of the functionality of an exemplary graphical user interface provided by system management tool 160 that may be used to display the additional details and/or reformatted information, according to one embodiment. In the illustrated example, a user 110 may use a particular input interface, such as a right-button click of a two-button mouse, to request additional detailed information on (or context-aware reformatting of) a particular entry 310 (e.g., selected entry 310A) that is currently being displayed within a view 106. In response, systems management tool 160 may be configured to generate a context-sensitive details window 510, which may comprise a plurality of tabs (such as tab 501A and 501B). Each tab 501 may display information related to the particular entry 310 according to a respective locale designation: for example, tab 501 may include information conforming to a locale designation L1 (e.g., United States English) associated with region 106A, and tab 501 may display the equivalent information conforming to a locale designation L2 (e.g., French). In some embodiments, the different sets of localized information may all be in view at the same time—e.g., the information contained in both tabs 501A and 501B may be displayed in two visible regions of the window, or in separate windows.

The information that is displayed in tabs 501 may be context-sensitive in that the number and content of detail elements 511A-511F and detailed text regions 512, and the manner in which the elements and regions are layed out on the tab 501, may depend on the nature of the systems management event represented by the corresponding entry 310. In one embodiment, for example, systems management tool 160 may be configured to categorize different systems management events based on a taxonomy of event types. An indication of the category to which a systems management event belongs may be provided using the values displayed in the "Type" column of regions 106 shown in FIG. 3-6, for example. In such embodiments, each category of systems management event may have a corresponding format or layout for a context-sensitive details window 510 associated with the category. Systems management tool 160 may be configured to identify the particular category to which the systems management event corresponding to the selected entry 310 belongs, select the context-specific format for displaying information on that category of events, and display the information in that format.

The layout of context-sensitive details window 510 may be organized in a way that may be more useful in summarizing the available information on the systems management event than entry 310, especially for entries that may contain numerous fields, which may be hard to view together in the regions 106. For certain types of managed entities 120, an operating system or a third-party application may provide a tool to help interact with or manage the entities. For systems management events related to such entities, systems management tool 160 may be configured to imitate the "look-and-feel" of the interfaces typically provided by those tools when generating context-sensitive details window 501. For example, if a disk monitoring tool "DMT" is typically used to analyze input/output performance, context-sensitive details window 510 may be designed to resemble the interface provided by DMT when displaying information about disks. In this way, users 110 may be provided with systems management information using interfaces with which they are already familiar, thereby potentially reducing the time taken to analyze systems management problems and the chances of human error.

In addition to reformatting systems management information in more useful ways, context-sensitive details windows 510 may also be used to display information aggregated from additional sources (e.g., sources other than entry 310) in some embodiments. For example, additional systems management databases 190 may be accessed for information relevant to the event category, or to the specific event for which details are being displayed. Any of a variety of specific input interfaces, such as double-clicking, right-clicking, or menu-driven input interfaces may be used to trigger the display of context-sensitive details window 510 in various embodiments. The specific tab whose contents are to be displayed in the foreground may be selected by clicking on the tab header (e.g., the region where the text "English (U.S)" or "French (France)" is displayed in some embodiments, and/or using other input interfaces such as "Tab" keys or "Function" keys on a keyboard in other embodiments.

In one embodiment, systems management tool 160 may allow users to invoke one or more actions, such as corrective actions or reporting actions, in response to a systems management event. FIG. 6 is a block diagram illustrating further aspects of the functionality of an exemplary graphical user interface provided by system management tool 160 that may be used to automatically fill out a form or to invoke an executable program or service, according to one embodiment. In the depicted example, a right-click on an entry 310 results in a display of a context sensitive details window 510 that includes buttons 610 and 615. As indicated in the detailed text region 512, the particular systems management event being analyzed in this example is a file system event. Button 610 may be used to invoke an executable program or service "Check_FS" to check one or more file systems, and button 615 may be used to fill out a locale-specific problem report form 515.

The executable program or programs that may be invoked may be specific to the category of systems management event being analyzed: e.g., for a file system event, an interface to invoke a file system management tool may be provided, while for a network related event an interface to a network management tool may be provided. In addition, the executable program or programs that a particular user may be allowed to invoke may be restricted in some embodiments, e.g., based on authorization privileges or roles of the user 110. Systems management tool 160 may be configured to communicate with authorization engine 195 to determine whether a particular user 110 has the appropriate privileges to execute a program, and may only display an interface allowing the invocation of the program (e.g., button 610) to authorized users. Thus, the contents of the context-sensitive details window 510 seen by a user 110 may be determined at least partly by the authorization level of the user in some embodiments. For example, programs that may potentially result in destructive actions (e.g., programs to reformat storage, reset a device, or restart a failed service) may only be invoked by administrative users in some implementations. Environment variables associated with the user may also be used by systems management tool 160 in some embodiments to determine at least part of the context-sensitive details window—e.g., a path variable may indicate the directories or locations of the set of executable programs to which the user has access, or an application-specific environment variable such as an "ORACLE_HOME" variable identifying a database management system installation directory may affect what is displayed. In one embodiment, part of the contents of context-sensitive details window 510 may be obtained from one or more message catalogs or from databases 190, while remaining contents may be determined based on authorization levels or environment variables.

If a user clicks on the "Fill Out Problem Report Form" button 615 in the example shown in FIG. 6, a localized and context-sensitive form window may be displayed. For example, in FIG. 6, the form 515 includes text indicating that the problem report will be mailed to an address including the term "FS_support" which may represent a file-system support organization. If the event represented by entry 310 were a network-related event, a different form, with different fields and directed at a different support address (e.g., "Network-_support") may have been generated. Some fields of the form (e.g., 610A and 610B) may be automatically filled by systems management tool 160, for example using part of the contents of entry 310 or using one or more environment variables associated with a user 110 that initiated the generation of the form, while other fields (e.g., fields 615A-615B and 620) may be filled out by the user. The text and instructions in the form may be displayed in accordance with the locale designation of the tab 501 from which the form was generated, i.e., in accordance with the preferred locale of a user 110 who initiated the generation of the form.

In one specific embodiment, at least a portion of the display provided by systems management tool may be user-customizable. For example, if an administrator of a particular data center becomes aware of a date-center-specific solution to a systems management problem, where the solution may not be applicable at other data centers, the administrator may customize the graphical user interface of systems management tool 160 to display information on the local solution. The custom information may, in some embodiments, only be displayed according to a particular locale designation, and may be obtained from a local support database maintained at the data center. This technique may be especially useful in quickly diagnosing and resolving problems that may be caused by a local condition, such as a known problem of network packets occasionally being dropped within a LAN at the data center. The application-level systems management messages generated as a result of the dropped packets may be at too high a level, or may be too generic, to identify the real source of the problem, and may result in unnecessary support calls or bug reports directed outside the data center. Customization of the systems management tool 160, e.g., by displaying a message such as "This problem is known to be caused due to an intermittent loss of packets in the LAN at data center XYZ, and is already being investigated" to local users in accordance with a preferred locale designation may prevent such unnecessary support calls or bug reports.

In various embodiments, additional features may be implemented in the graphical user interface provided by systems management tool 160. For example, in some embodiments, hypertext links may be provided via the interface, allowing a user 110 to navigate to web pages containing information related to a systems management event of interest. In other embodiments, links to a localized on-line glossary of terms may be provided, allowing the user to learn the meanings of various terms (expressed in the language preferred by the user) used in the systems management information. The look-and-feel of the graphical interface may differ from that shown in FIG. 3-FIG. 6 in some embodiments. In one embodiment, systems management tool 160 may also provide one or more non-graphical interfaces (e.g., command-line interfaces) to provide some of the functionality described above.

Figure 7:
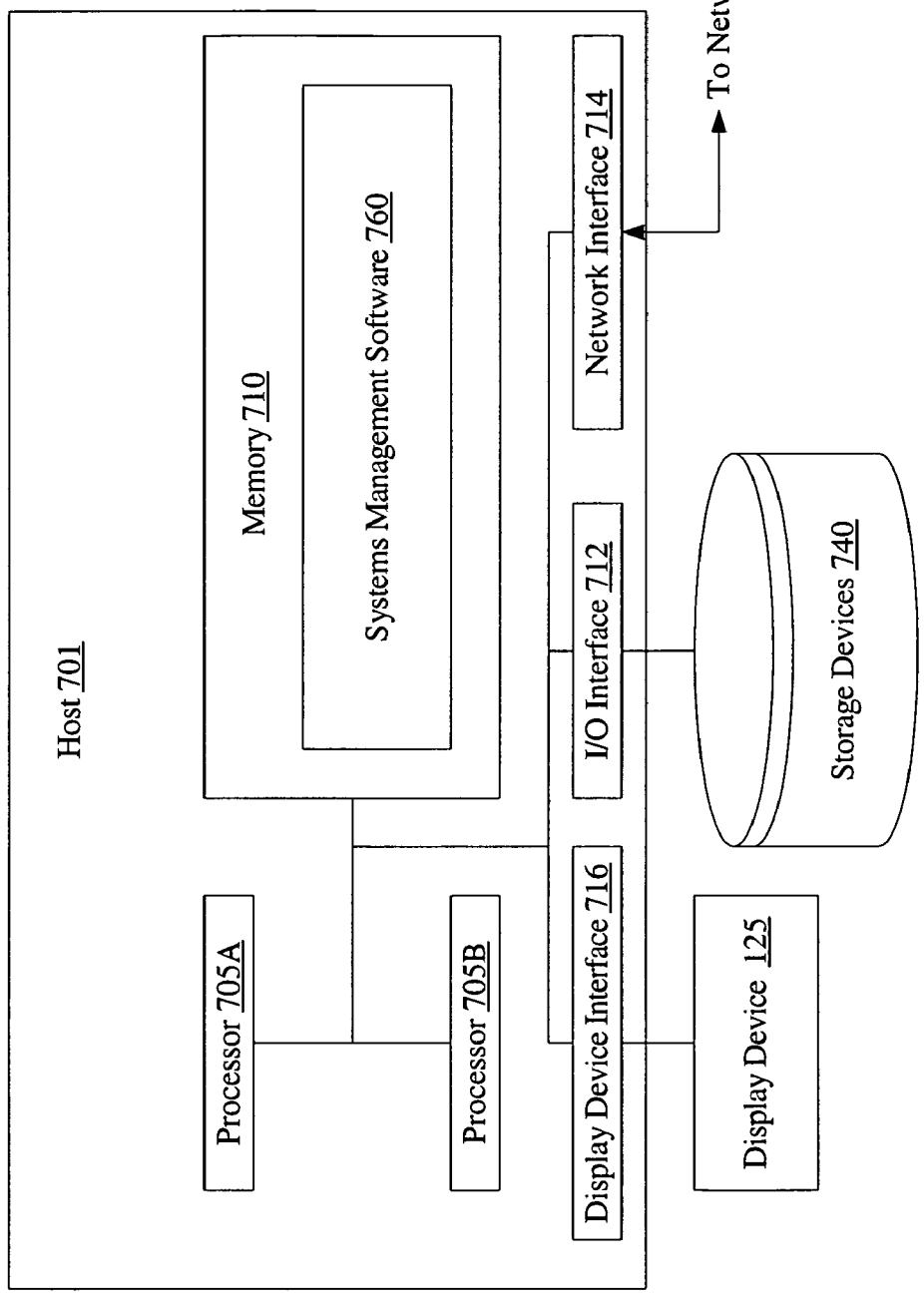
FIG. 7 is a block diagram illustrating constituent elements of a computer host according to one embodiment.

FIG. 7 is a block diagram illustrating constituent elements of a computer host 701, according to one embodiment. As shown, host 701 may comprise one or more processors such as processors 705A and 705B coupled to one or more memories such as memory 710. Processors 705A and 705B may be implemented using any desired architecture or chip set, such as the SPARC™ architecture from Sun Microsystems or the x86-compatible architectures from Intel Corporation, Advanced Micro Devices, etc Systems management software 760 comprising program instructions that may be executable to implement the functionality of system management tool 160 as described above may be partly or fully resident within a memory 710 at a given point in time. Memory 710 may be implemented using any appropriate medium such as any of various types of RAM (e.g., DRAM, SDRAM, RDRAM, SRAM, etc.). Host 701 may also include one or more I/O interfaces 712 providing access to storage devices 740, one or more network interfaces 714 providing access to network 150, and one or more display device interfaces 716 providing access to a display device 125. A display device 125 may be implemented using any desired display technology, such as Cathode Ray Tube (CRT) technology, Liquid Crystal Display (LCD) technology, etc. Part or all of the program instructions that may be executable to implement the functionality of system management tool 160 may also be stored within storage devices 740. In addition to systems management software 160, memory 710 and/or storage devices 740 may also store operating systems software, software for various applications and managed devices 120, event record aggregator 115, databases 190, and/or authorization engine 195 in various embodiments. In some embodiments, systems management software 760 may be included within an operating system or another software package, while in other embodiments, systems management software 760 may be packaged as a standalone product. In some embodiments, part or all of the functionality of systems management tool 160 may be implemented via one or more hardware devices (e.g., via one or more Field Programmable Gate Array (FPGA) devices) or in firmware. Storage devices 740 may include any desired type of persistent and/or volatile storage devices, such as individual disks, disk arrays, optical devices such as CD-ROMs, CD-RW drives, DVD-ROMs, DVD-RW drives, flash memory devices, various types of RAM and the like. One or more storage devices 740 may be directly coupled to host 701 in some embodiments (e.g., using the Small Computer Systems Interface (SCSI) protocol), or may be accessible over any desired storage interconnect such as a fiber channel fabric or storage area network (SAN) in other embodiments.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method, comprising:
receiving a request for information associated with a computer systems management event;
dynamically identifying a first locale designation corresponding to a first user of a systems management tool, and a second locale designation corresponding to a second user of the systems management tool;
the systems management tool concurrently displaying information associated with the computer systems management event according to the first locale designation and according to the second locale designation, wherein the displayed information comprises a first subset localized for the first locale designation and a second subset localized for the second locale designation, wherein the first subset differs from the second subset;
receiving a request from the first user to perform an action on the first subset of the displayed information;
performing the requested action on the first subset of the displayed information in response to receiving the request from the first user, wherein performing the requested action on the first subset of the displayed information comprises generating a modified first subset of the displayed information;
automatically identifying the second subset of the displayed information as corresponding to the first subset of the information;
automatically performing an action corresponding to the requested action on the second subset of the displayed information, wherein automatically performing the action corresponding to the requested action on the second subset of the displayed information comprises generating a modified second subset of the displayed information; and
the systems management tool concurrently displaying the modified first subset of the displayed information and the modified second subset of the displayed information, wherein the modified first subset differs from the modified second subset.

2. The method as recited in claim 1, wherein at least a portion of the information associated with the computer systems management event is transmitted over a wide area network to be displayed according to the second locale designation.

3. The method as recited in claim 1, further comprising:
providing an interface to select the first locale designation from among a plurality of locale designations; and
dynamically identifying the first locale designation in response to input received via the first interface.

4. The method as recited in claim 3, wherein the input received via the first interface is provided by a third user.

5. The method as recited in claim 1, further comprising:
dynamically identifying the first locale designation based on a mapping between a network address and a geographical location, wherein the network address is associated with a network connection in use by the first user.

6. The method as recited in claim 1, further comprising:
obtaining at least a first portion of the information displayed according to the first locale designation from a message catalog; and determining at least a second portion of the information displayed according to the first locale designation based on an environment variable other than the first locale designation, wherein the environment variable is associated with the first user.

7. The method as recited in claim 1, wherein the information displayed according to the first locale designation is included within a first entry of a first list of entries displayed according to the first locale designation, wherein each entry of the first list of entries includes information about a particular computer systems management event, wherein the information displayed according to the second locale designation is included within a second entry of a second list of entries displayed according to the second locale designation, wherein each entry of the second list of entries corresponds to a respective entry of the first list of events.

8. The method as recited in claim 7, further comprising:
providing an interface to perform an action on a specific entry of the first list of entries; and
in response to input received via the interface, automatically performing a corresponding action on a corresponding entry in the second list of entries.

9. The method as recited in claim 1, further comprising:
providing a first interface to request detailed information associated with the computer systems management event; and
in response to input received via the first interface,
identifying the computer systems management event as belonging to a particular category of a plurality of categories of computer systems management events;
selecting a context-specific format for displaying detailed information on computer systems management events of the particular category; and
concurrently displaying the detailed information according to the first and the second locale designations in the context-specific format.

10. The method as recited in claim 9, wherein the detailed information is displayed according to the first locale designation in a display region associated with a first tab, and the detailed information is displayed according to the second locale designation in a display region associated with a second tab.

11. The method as recited in claim 9, further comprising:
in response to the input received via the first interface,
identifying an executable service based on the particular category and on an authorization privilege of a provider of the input; and
providing a second interface to request invocation of the executable service.

12. The method as recited in claim 9, further comprising, in response to the input received via the first interface,
providing a second interface to fill a problem report form; and
automatically filling out at least a portion of the problem report form in accordance with a locale designation associated with a provider of the input.

13. The method as recited in claim 1, further comprising:
customizing at least a portion of a display provided by the systems management tool based on contents of a local support database at a particular data center.

14. A system, comprising:
a processor; and
memory coupled to the processor,
wherein the memory stores program instructions computer-executable by the processor to implement a systems management tool, wherein the systems management tool is configured to:

receive a request for information associated with a computer systems management event;
dynamically identify a first locale designation corresponding to a first user of the systems management tool, and a second locale designation corresponding to a second user of the systems management tool;
concurrently display information associated with the computer systems management event according to the first locale designation and according to the second locale designation, wherein the displayed information comprises a first subset localized for the first locale designation and a second subset localized for the second locale designation, wherein the first subset differs from the second subset;.
receive a request from the first user to perform an action on the first subset of the displayed information;
perform the requested action on the first subset of the displayed information in response to receiving the request from the first user, wherein in performing the requested action on the first subset of the displayed information, the systems management tool is configured to generate a modified first subset of the displayed information;
automatically identify the second subset of the displayed information as corresponding to the first subset of the information;
automatically perform an action corresponding to the requested action on the second subset of the displayed information, wherein in automatically performing the action corresponding to the requested action on the second subset of the displayed information, the systems management tool is configured to generate a modified second subset of the displayed information; and
concurrently display the modified first subset of the displayed information and the modified second subset of the displayed information, wherein the modified first subset differs from the modified second subset.

15. The system as recited in claim 14, wherein at least a portion of the information associated with the computer systems management event is transmitted over a wide area network to be displayed according to the second locale designation.

16. The system as recited in claim 14, wherein the systems management tool is further configured to:
obtain at least a first portion of the information displayed according to the first locale designation from a message catalog; and
determine at least a second portion of the information displayed according to the first locale designation based on an environment variable other than the first locale designation, wherein the environment variable is associated with the first user.

17. The system as recited in claim 14, wherein the information displayed according to the first locale designation is included within a first entry of a first list of entries displayed according to the first locale designation, wherein each entry of the first list of entries includes information about a particular computer systems management event, wherein the information displayed according to the second locale designation is included within a second entry of a second list of entries displayed according to the second locale designation, wherein each entry of the second list of entries corresponds to a respective entry of the first list of events.

18. The system as recited in claim 17, wherein the systems management tool is further configured to:
provide an interface to perform an action on a specific entry of the first list of entries; and in response to input received via the interface, automatically perform a corresponding action on a corresponding entry in the second list of entries.

19. A non-transitory, computer readable storage medium comprising program instructions, wherein the instructions are computer-executable to:

receive a request for information associated with a computer systems management event;

dynamically identify a first locale designation corresponding to a first user of a systems management tool, and a second locale designation corresponding to a second user of the systems management tool;

concurrently display information associated with the computer systems management event according to the first locale designation and according to the second locale designation, wherein the displayed information comprises a first subset localized for the first locale designation and a second subset localized for the second locale designation, wherein the first subset differs from the second subset;

receiving a request from the first user to perform an action on the first subset of the displayed information;

performing the requested action on the first subset of the displayed information in response to receiving the request from the first user, wherein performing the requested action on the first subset of the displayed information comprises generating a modified first subset of the displayed information;

automatically identifying the second subset of the displayed information as corresponding to the first subset of the information;

automatically performing an action corresponding to the requested action on the second subset of the displayed information, wherein automatically performing the action corresponding to the requested action on the second subset of the displayed information comprises generating a modified second subset of the displayed information; and concurrently displaying the modified first subset of the displayed information and the modified second subset of the displayed information, wherein the modified first subset differs from the modified second subset.

20. The non-transitory, computer readable storage medium as recited in claim 19, wherein at least a portion of the information associated with the computer systems management event is transmitted over a wide area network to be displayed according to the second locale designation.

21. The non-transitory, computer readable storage medium as recited in claim 19, wherein the instructions are further computer-executable to:

obtain at least a first portion of the information displayed according to the first locale designation from a message catalog; and determine at least a second portion of the information displayed according to the first locale designation based on an environment variable other than the first locale designation, wherein the environment variable is associated with the first user.

22. The non-transitory, computer readable storage medium as recited in claim 19, wherein the information displayed according to the first locale designation is included within a first entry of a first list of entries displayed according to the first locale designation, wherein each entry of the first list of entries includes information about a particular computer systems management event, wherein the information displayed according to the second locale designation is included within a second entry of a second list of entries displayed according to the second locale designation, wherein each entry of the second list of entries corresponds to a respective entry of the first list of events.

23. The non-transitory, computer readable storage medium as recited in claim 22, wherein the instructions are further computer-executable to:

provide an interface to perform an action on a specific entry of the first list of entries; and in response to input received via the interface, automatically perform a corresponding action on a corresponding entry in the second list of entries.

* * * * *